United States Patent [19]

Benedict et al.

[11] Patent Number: 4,460,802

[45] Date of Patent: Jul. 17, 1984

[54] RADIALLY ACTIVATED THERMOCOUPLE ASSEMBLY

[75] Inventors: Robert P. Benedict, Media; Paul Beckman, Huntingdon Valley, both of Pa.

[73] Assignees: Westinghouse Electric Corporation, Pittsburgh; Paul Beckman, Huntingdon Valley, both of Pa. ; a part interest

[21] Appl. No.: 449,946

[22] Filed: Dec. 15, 1982

[51] Int. Cl.³ .............................................. H01L 35/02
[52] U.S. Cl. ..................................... 136/230; 136/242
[58] Field of Search ................................ 136/230, 242

[56] References Cited

U.S. PATENT DOCUMENTS

| | | | |
|---|---|---|---|
| 1,847,059 | 2/1932 | Beshara | 136/230 X |
| 3,351,498 | 11/1967 | Shinn et al. | 136/230 X |
| 3,547,706 | 12/1970 | McGrew | 136/230 X |
| 4,324,945 | 4/1982 | Sivyer | 136/242 |

Primary Examiner—Leland A. Sebastian
Attorney, Agent, or Firm—D. Schron

[57] ABSTRACT

The lower end of a hollow thermocouple well is removed and replaced by an end cap of a different thermocouple material than the well so that the junction between the end cap and the end portion of the well defines a radially activated thermocouple junction. A wire of the same material as the end cap is affixed to the end cap and electrical connections are made to the wire and to the well to provide a thermocouple output signal indicative of temperature measurement. In another embodiment two end caps are utilized at the end of the thermocouple well with the two end caps being of two dissimilar thermocouple elements and which have the necessary electrical connections made thereof to provide a thermocouple output signal.

21 Claims, 16 Drawing Figures

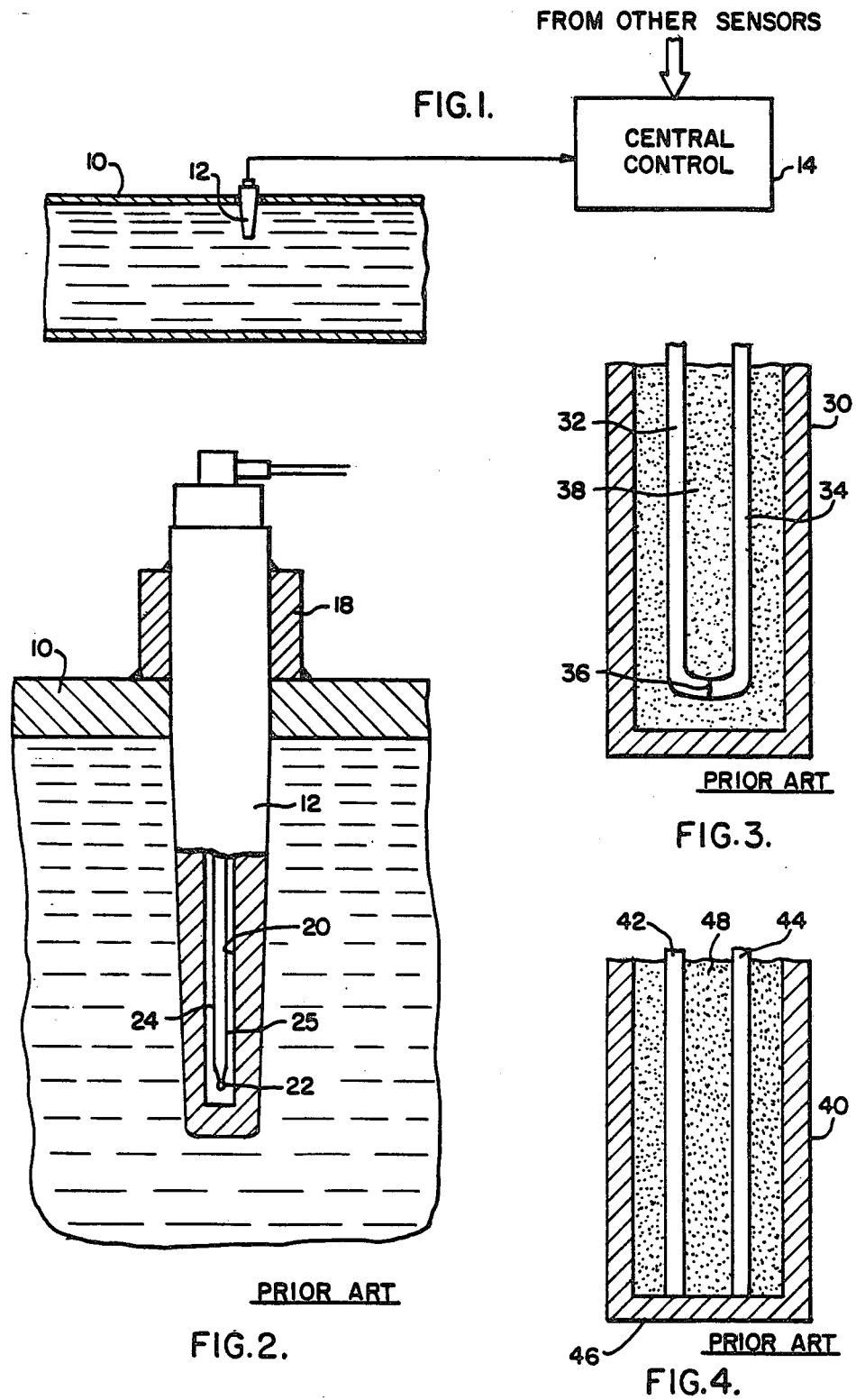

RADIALLY ACTIVATED THERMOCOUPLE ASSEMBLY

BACKGROUND OF THE INVENTION

1. Field of the Invention

The invention in general relates to temperature measuring apparatus, and more particularly to an extremely rapid response thermocouple sensor,

2. Description of the Prior Art

Thermocouples are used in various operations where an indication of temperature must be obtained. One conmon use is to evaluate the performance for the subsequent control of an industrial process utilizing a working fluid. Since the fluid may be at an elevated pressure and temperature the thermocouple is positioned within a protective thermocouple well which is in heat transfer relation with the fluid and which can withstand the severities encountered in the system.

For many industrial processes a problem exists in that the conventional thermocouple arrangement above described exhibits an objectionally large response time which may result in inaccurate temperature measurements, and a consequent slow response of necessary controls to a change in temperature. The present invention provides for a thermocouple arrangement which may be used in such industrial processes and which exhibits a much faster response time resulting in better stability in the process control.

SUMMARY OF THE INVENTION

The thermocouple of the present invention includes an elongated thermocouple well which has a wall portion surrounding a central axis to define an interior cavity. A thermocouple arrangement is provided at one end of the wall portion and includes first and second thermocouple elements arranged such that their junction extends generally radially from the outer surface of the wall inwardly toward the central axis. In one embodiment an end cap is affixed to and closes off an end of the wall portion with the end cap and wall being of dissimilar metals defining a thermocouple in the area where they are joined, which area is an annular area surrounding the central axis. In another arrangement first and second end caps of dissimilar metals are utilized with the end caps being joined together to define a thermocouple junction and with appropriate electrical connections being made to the end caps up through the interior cavity.

BRIEF DESCRIPTION OF THE DRAWINGS

FIG. 1 is a view of a typical use for a thermocouple in an industrial process;

FIG. 2 is a view, with a portion broken away, of the thermocouple well of FIG. 1;

FIGS. 3 through 5 are sectional views of various prior art thermocouples;

DESCRIPTION OF THE PREFERRED EMBODIMENTS

Figure 5:
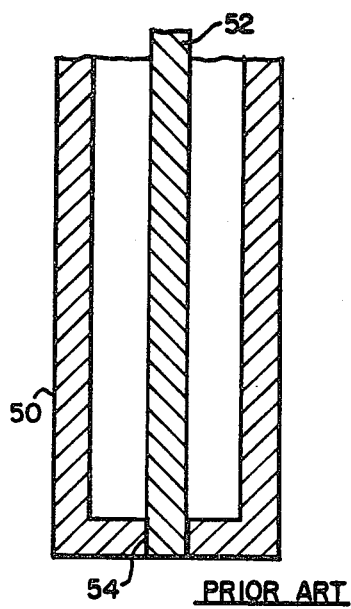

Referring now to FIG. 1, numeral 10 designates an industrial process component such as a fluid conveying conduit which may be found in a steam turbine-generator power plant by way of example. The interior of conduit 10 is at an elevated pressure and temperature and in order to obtain an indication of the temperature of the working fluid, steam, there is provided a thermocouple well 12 which contains a temperature measuring thermocouple and which is inserted into the fluid flow. The thermocouple output voltage is provided to a central control 14 which, in conjunction with other sensor indications, including thermocouple indications, is operative to evaluate the performance and/or control the components of the steam turbine generator plant. A typical thermocouple well is illustrated in somewhat more detail in FIG. 2, As seen in FIG. 2 well 12 is inserted through an aperture in component 10 and is secured to a boss 18 such as by welding and which in turn is welded to the component 10, so as to maintain pressure integrity, The well itself includes a hollow interior 20 of a dimension such that the wall of the well exposed to the working fluid is of sufficient dimension to withstand the operating pressure.

A small thermocouple junction 22 formed at the end of leads 24 and 25 is positioned at the lower end of hollow interior 20 which may also be packed with an insulating material. The temperature of the working fluid is communicated to the thermocouple junction through the relatively massive wall of the well 12 and through the insulating material within hollow interior 20. For many applications the time for the thermocouple junction to respond to a change in temperature is excessively long resulting in an instability in the control of certain components.

FIGS. 3 to 5 illustrate thermocouple arrangements which may be used directly in various relatively low pressure applications or which may themselves be placed in a thermocouple well, such as in FIG. 2, for temperature measurements at relatively high pressures.

In FIG. 3 a container or sheath 30, which may be of stainless steel, includes in the interior thereof first and second thermocouple wires 32 and 34 forming a thermocouple junction 36 at the lower end of the sheath. As is standard practice, the interior may be filled with an insulating material 38 such as magnesium oxide, boron nitride or aluminum oxide, by way of example.

In FIG. 4 cylindrical sheath 40 inclues first and second thermocouple wires 42 and 44 which form a grounded junction thermocouple with the lower end 46 of sheath 40. The interior is filled with an insulating medium 48 as was the case with respect to FIG. 3.

Another variation of the thermocouple is illustrated in FIG. 5 and includes an outer cylinder 50 forming one component of the thermocouple in conjunction with an inner rod 52 forming the other component with the thermocouple junction 54 being formed at the lower end of the arrangement.

Generally, prior art thermocouple arrangements which have relatively fast response times are not suitable for high pressure operation in which the pressure integrity of a component must be maintained. The placement of these thermocouples into a protective well however substantially and objectionably reduces the response time, The present invention provides for an improved quick response thermocouple arrangement which may be used in high pressure situations and to this end reference is made to FIGS. 6A through 6D.

Figure 6A:
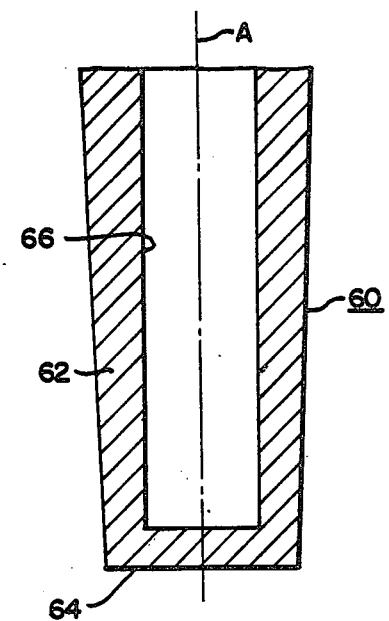
FIGS. 6A through 6D are cross sectional views illustrating the steps in the manufacture of a thermocouple in accordance with the present invention.

FIG. 6A illustrates a typical thermocouple well 60 having a sidewall portion 62 surrounding a central axis A and having an integral end 64, the arrangement defining an interior cavity 66.

Figure 6B:
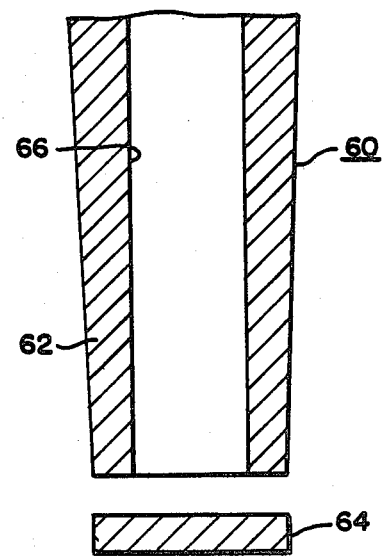

In accordance with the present invention the standard well is modified, as illustrated in FIG. 6B, by removing the integral end 64 by any one of a number of well known machining operations.

Figure 6C:
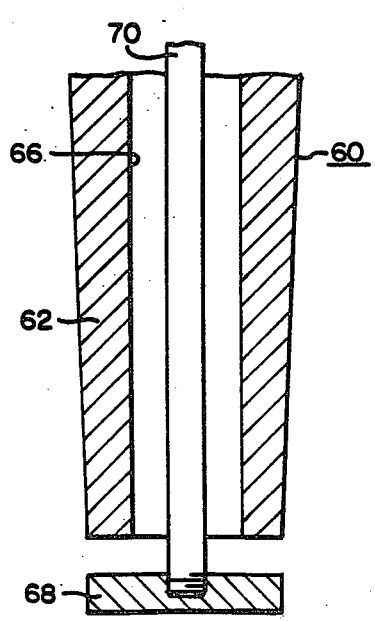
Figure 6D:
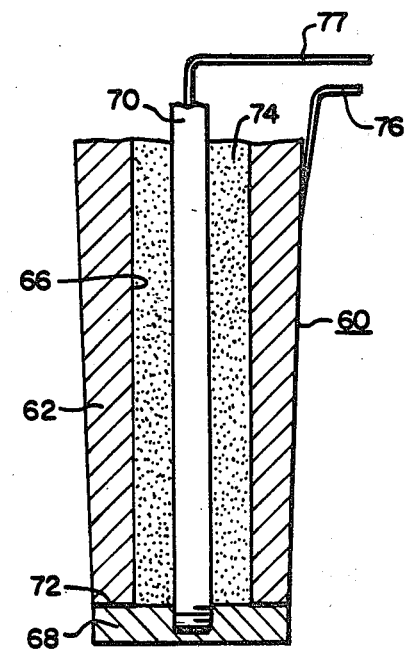

As illustrated in FIG. 6C the next step in the assembly operation is the provision of a new replacement disk or end cap 68 of a different material than that of the wall 62 and which includes a heavy duty wire or rod 70 secured to the end cap 68 such as by threaded engagement, and preferably being of the same material. End cap 68 is then affixed to the end of side wall 62 such as by high temperature furnace brazing forming a thermocouple junction 72 therebetween as illustrated in FIG. 6D. The thickness of end cap 68 is selected such that in conjunction with the brazing operation pressure integrity of the vessel is maintained. The interior cavity 66 is packed with an insulating medium 74 and suitable electrical connections, as represented by leads 76 and 77 are made to the side wall 62 of one metal such as stainless steel and to the central wire 70 of a different metal such as nickel.

As an alternate construction, an end cap of one metal may form a thermocouple junction with the end of a tube of a different metal, with the tube and end cap being of sufficient thickness to withstand the high pressure to be encountered during operation. Use of a tube would eliminate the machining step of FIG. 6B.

Figure 7:
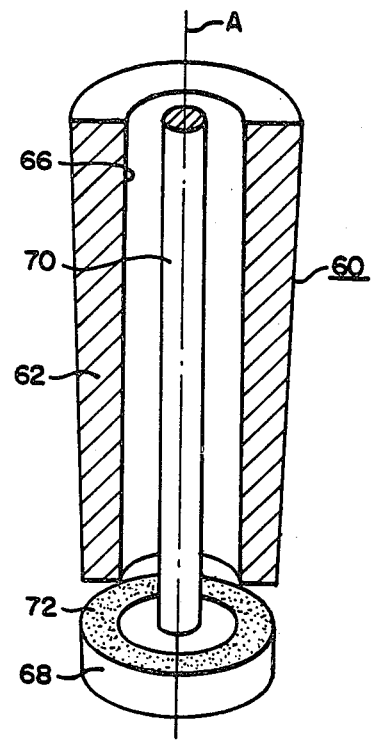
FIG. 7 is an exploded sectional view illustrating the thermocouple junction of the device fabricated in accordance with FIG. 6A through 6D.

The thermoelectric junction 72 formed between the end cap 68 and the bottom of the thermocouple well 60 can best be seen in the exploded view of FIG. 7. The junction 72 extends generally radially from the outer surface of well 60 inwardly to the interior cavity 66 and defines an annular area, shown shaded, which surrounds, and lies in a plane perpendicular to, the central axis. The nature of this construction is such that the junction responds extremely rapidly to changes in temperature of the fluid in which the well is immersed because of the radial arrangement and its intimate contact with the fluid environment. Due to the relatively massive size of each thermocouple element, the side wall 62 and end cap 68, an extremely stable output signal is generated at the output leads 76 and 77 (FIG. 6D).

Figure 8:
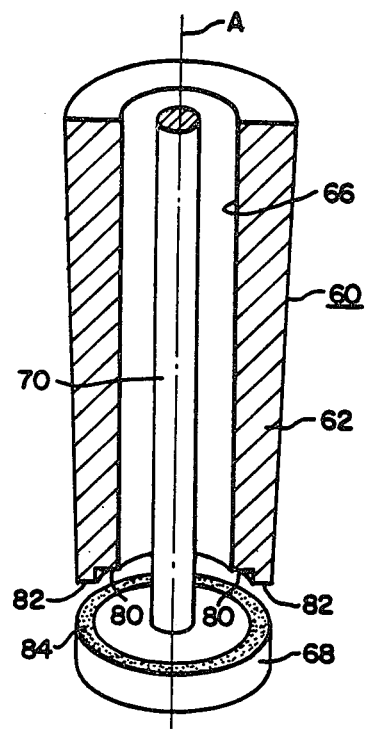
FIG. 8 is an exploded sectional view of a thermocouple with a reduced junction size in accordance with the present invention.

A thermocouple junction with an even faster response time may be achieved by undercutting the end of wall 62 as indicated by undercut portion 80 in FIG. 8, and thereafter brazing the remaining end portion 82 to end cap 68 resulting in a thermocouple junction 84 of a reduced radial dimension compared to the junction illustrated in FIG. 7. The smaller the radial dimension the faster will be the response time however the amount of undercutting, and therefore the dimension of the remaining end portion 82 will be dependent upon the pressure integrity to be maintained. For extremely high pressure uses it may be necessary to utilize the entire end of wall 62 in the brazing operation and thermocouple junction formation.

In the example thus far described, the thermocouple will provide a temperature indicative voltage by using two dissimilar thermocouple elements, given by way of example as stainless steel (well 60) and nickel (end cap 68). A different voltage output for the same temperature measurement will be provided by using different thermocouple materials such as chromel-alumel or ironconstantan, by way of example to provide, what might be considered as a "standard" emf output of conventional thermocouple magnitude. In order to provide this standard emf with a conventional stainless steel thermocouple well an arrangement such as illustrated in FIGS. 9 and 10 may be utilized.

Figure 9:
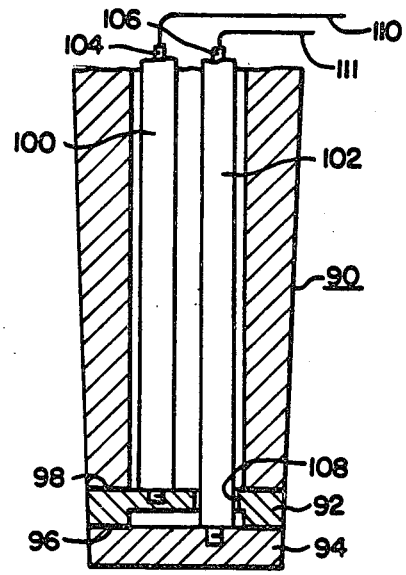
FIGS. 9 and 10 illustrate an alternate embodiment of the present invention.

In FIG. 9 a conventional thermocouple well 90 such as of stainless steel has at its lower end first and second end caps 92 and 94 of different thermocouple materials. For example, end cap 92 may be of chromel while end cap 94 may be of alumel brazed thereto forming a thermocouple junction 96 radially activated as previously described. The double end cap arrangement is affixed to the lower end of thermocouple well 90 such as by brazing 98.

Insulating tubes 100 and 102 such as lava tubes are provided for electrically insulating chromel rod or wire 104 affixed to chromel end cap 92 and alumel rod or wire 106 connected to alumel end cap 94. As illustrated in FIG. 9 as well as the exploded view in FIG. 10, tube 102 extends through an aperture 108 provided in end cap 92. A thermocouple output signal is derived from leads 110 and 111 connected to respective chromel and alumel wires 104 and 106.

Figure 10:
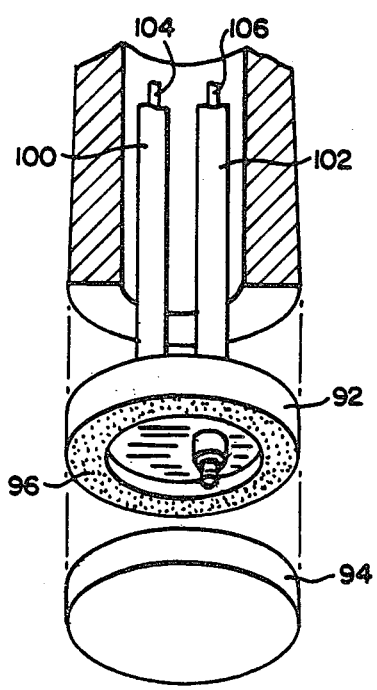

Although FIGS. 9 and 10 illustrate a side-by-side placement of chromel and alumel wires 104 and 106, other arrangements are possible such as the placement of an alumel wire coaxially within, and insulated from, a chromel tube, with the wire and tube contacting respective disks 94 and 92.

Figure 11:
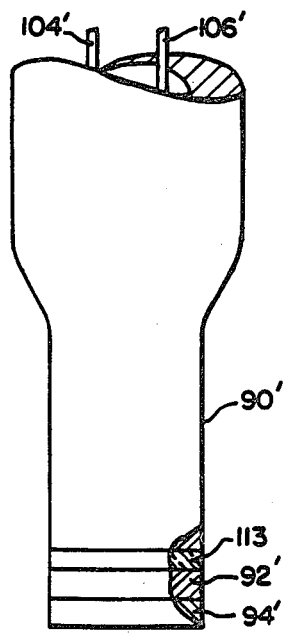
FIG. 11 is a view, with a portion broken away, of an ungrounded thermocouple arrangement.

In the assembly of FIG. 9, the end caps 92 and 94 are in electrical contact with the metallic thermocouple well 90 and hence constitute a grounded thermocouple arrangement. The structure however is also applicable to an ungrounded thermocouple arrangement as illustrated in FIG. 11 wherein parts similar to those in FIG. 9 have been given primed reference numerals.

End caps 92' and 94' are positioned at the lower end of thermocouple well 90' illustrated by way of example as having a smaller diameter than the remainder of the well. End caps 92' and 94' however are electrically insulated from the lower end of metallic well 90' by means of an insulating washer 113, which may be of alumina ($Al_2O_3$), suitably metallized and brazed to the bottom of well 90' and to the top of end cap 92', to thereby electrically insulate the thermocouple from the metallic well.

Figure 12:
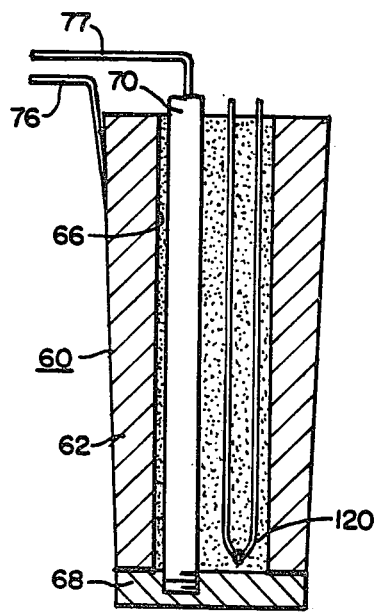
FIG. 12 is a sectional view illustrating the thermocouple of the present invention in conjunction with a conventional thermocouple.

FIG. 12 represents an arrangement wherein an improved thermocouple apparatus such as illustrated in FIG. 6D is provided with a temperature sensing device such as a conventional thermocouple 120 which although slow to respond to temperature changes would provide a reliable temperature indication in the steady state condition thereby being useful for a redundant measurement. This function could also, if desired, be provided by a conventional resistance temperature detector (RTD).

Figure 13:
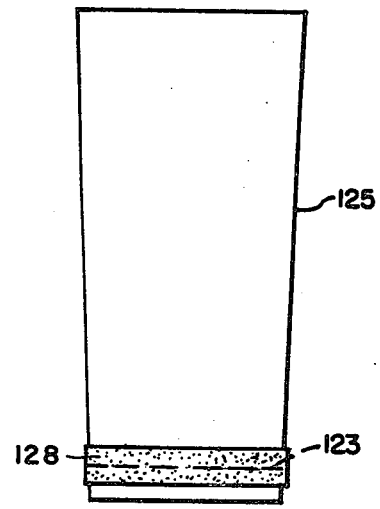
FIG. 13 illustrates a protective coating which may be utilized with the thermocouple apparatus described herein.

With the thermocouple apparatus of the present invention being used in a hostile environment there exists the posssibility of corrosion at the outermost exposed portion of the radial thermocouple junction. In order to prevent degradation of operation due to this corrosion, and as illustrated in FIG. 13, the outermost surface of the radial junction, as represented by dotted line 123 at the lower end of thermocouple well 125 may be provided with a protective coating 128 which may, for example, be a ceramic or metal coating flame sprayed on to a thickness of a few micro inches. Thus, a rapid response is insured while junction corrosion is prevented. The protective coating concept may also be applied to the arrangements illustrated in FIGS. 9 and 11.

What we claim is:

1. Thermocouple apparatus comprising:
   (A) an elongated thermocouple well having a wall portion surrounding a central axis and defining an interior cavity;
   (B) a thermocouple positioned at one end of said wall portion and including first and second dissimilar thermocouple elements;
   (C) said first and second thermocouple elements being arranged to respond to radial heat transfer from the outer surface of said wall portion inwardly toward said interior cavity.

2. Thermocouple apparatus comprising:
   (A) an elongated thermocouple well having a wall portion surrounding a central axis and defining an interior cavity;
   (B) a thermocouple positioned at one end of said wall portion and including first and second dissimilar thermocouple elements;
   (C) said first and second thermocouple elements being constructed and arranged such that their junction extends generally radially from the outer surface of said wall portion inwardly toward said interior cavity.

3. Thermocouple apparatus comprising:
   (A) an elongated thermocouple well having a wall portion surrounding a central axis and defining an interior cavity;
   (B) a thermocouple positioned at one end of said wall portion and including first and second dissimilar thermocouple elements;
   (C) said first and second thermocouple elements being constructed and arranged such that their junction defines an annular area surrounding said central axis.

4. Apparatus according to claim 3 wherein:
   (A) said junction lies in a plane perpendicular to said central axis.

5. Thermocouple apparatus comprising:
   (A) an elongated thermocouple well having a wall portion surrounding a central axis and defining an interior cavity;
   (B) said wall portion being of a first metal;
   (C) an end cap affixed to, and closing off, an end of said wall portion and being of a second and dissimilar metal;
   (D) said first and second dissimilar metals defining a thermocouple junction in the area of said affixation; and
   (E) means for making electrical connection with said end cap and said wall portion.

6. Apparatus according to claim 5 which includes:
   (A) a wire of said second metal in intimate contact with said end cap.

7. Apparatus according to claim 6 wherein:
   (A) said wire is disposed within said interior cavity; and which includes:
   (B) electrical insulation means surrounding said wire.

8. Apparatus according to claim 7 wherein:
   (A) said wire is coaxial with said central axis.

9. Apparatus according to claim 7 wherein:
   (A) said electric insulation means fills said interior cavity.

10. Apparatus according to claim 5 wherein:
    (A) said end cap is brazed to said end of said wall portion.

11. Apparatus according to claim 5 which includes:
    (A) additional temperature sensing means disposed within said interior cavity to provide a redundant temperature indication.

12. Apparatus according to claim 5 wherein:
    (B) said end of said wall portion has a portion removed from the inner wall so as to provide for an annular area of affixation of a radial thickness less than the normal radial thickness of said end of said wall portion.

13. Thermocouple apparatus comprising:
    (A) an elongated thermocouple well having a wall portion surrounding a central axis and defining an interior cavity;
    (B) a first end cap affixed to an end of said wall portion;
    (C) said first end cap including an aperture therethrough;
    (D) a second end cap affixed to said first end cap;
    (E) said first and second caps being of respective first and second thermocouple metals;
    (F) a first wire, of said first metal, being connected to said first end cap and extending up through said interior cavity;
    (G) a second wire of said second metal being connected to said second end cap and extending through said aperture and up said interior cavity.

14. Apparatus according to claim 13 which includes:
    (A) tubular electrical insulating means containing said second wire and extending through said aperture.

15. Apparatus according to claim 13 wherein:
    (A) the area of said affixation of said first and second end caps defining an annular area surrounding said central axis.

16. Thermocouple apparatus comprising:
    (A) an elongated thermocouple well having a wall portion surrounding a central axis and defining an interior cavity;
    (B) electrically insulating means affixed to an end of said wall portion;
    (C) a first end cap affixed to said electrically insulating means;
    (D) said first end cap including an aperture therethrough;
    (E) a second end cap affixed to said first end cap;
    (F) said first and second caps being of respective first and second thermocouple metals;
    (G) a first wire, of said first metal, being connected to said first end cap and extending up through said interior cavity;

(H) a second wire of said second metal being connected to said second end cap and extending through said aperture and up said interior cavity.

17. Apparatus according to claim 16 wherein:
(A) said electrically insulating means is an alumina washer.

18. Apparatus according to claim 5 wherein:
(A) said area of affixation lies in a plane perpendicular to said central axis.

19. Apparatus according to claim 5 which includes:
(A) a protective coating sealing off from the ambient medium the exposed joint between said wall portion and said end cap.

20. Apparatus according to claim 13 which includes:
(A) a protective coating sealing off from the ambient medium the exposed joints between said wall portion and said first end cap, and between said end caps.

21. Apparatus according to claim 16 which includes:
(A) a protective coating sealing off from the ambient medium the exposed joint between said wall portion and said end cap insulating means, between said insulating means and said end caps and between said end caps.

* * * * *